March 24, 1931. W. H. LONG 1,797,529
WHEEL RIM MOUNTING
Filed Sept. 14, 1927 2 Sheets-Sheet 1
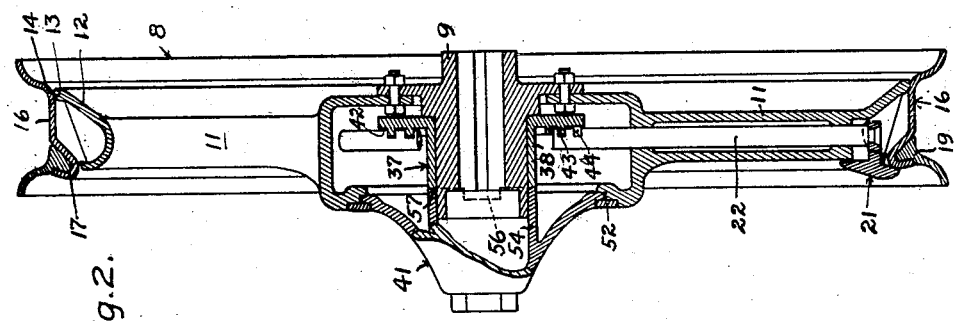
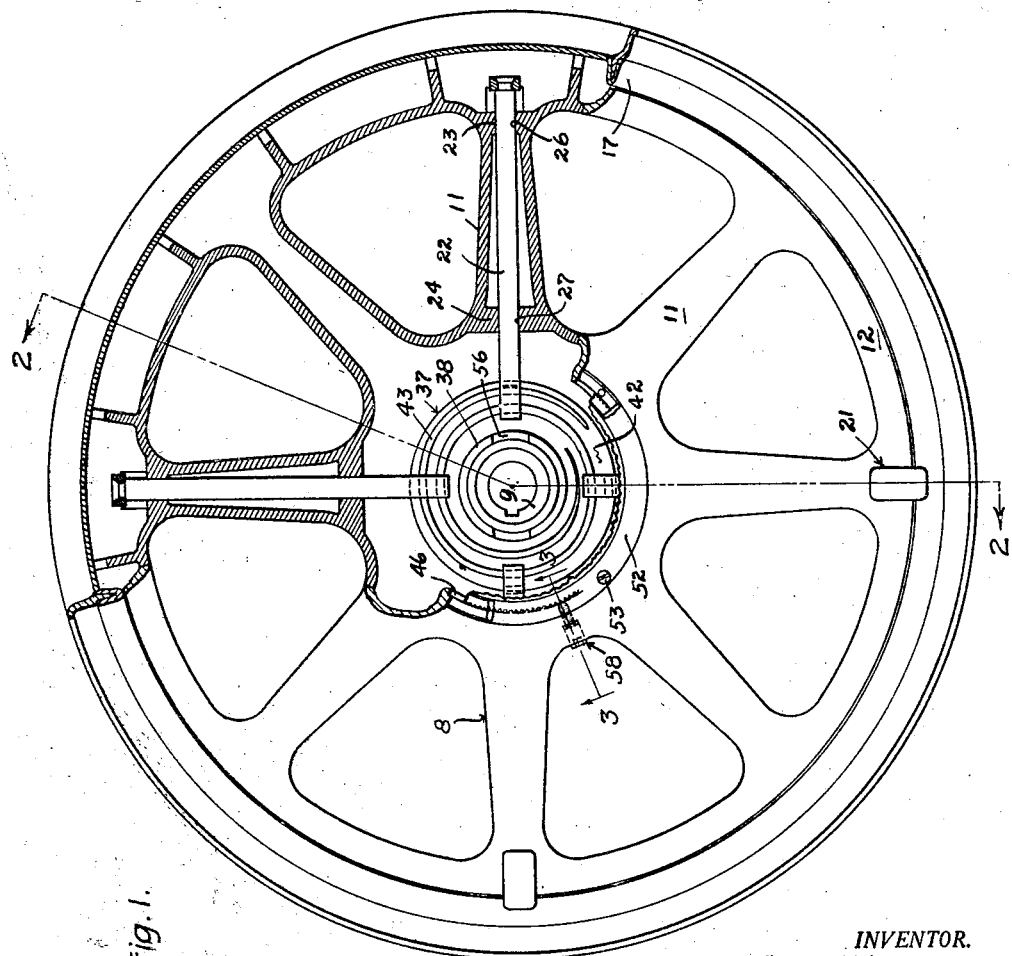
INVENTOR.
WILLIAM H. LONG
BY Joseph B. Gardner
ATTORNEY March 24, 1931. W. H. LONG 1,797,529
WHEEL RIM MOUNTING
Filed Sept. 14, 1927 2 Sheets-Sheet 2
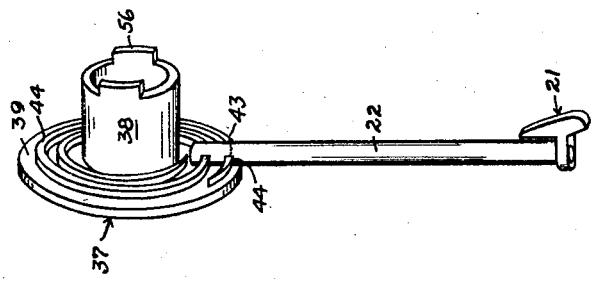
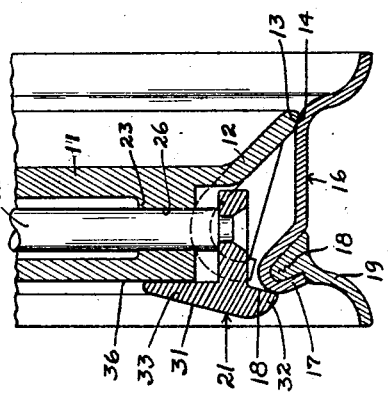
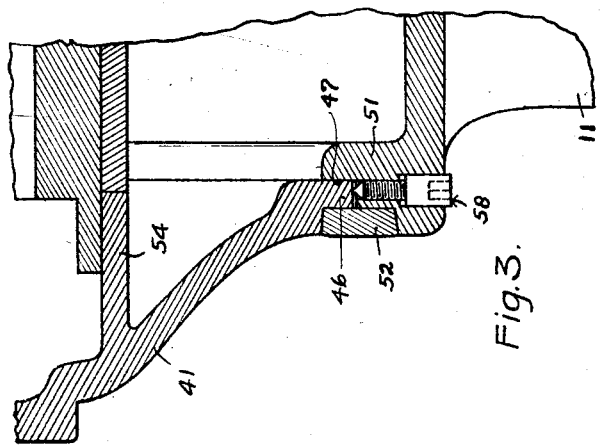
INVENTOR.
WILLIAM H. LONG.
BY
ATTORNEYS.

Patented Mar. 24, 1931

1,797,529

UNITED STATES PATENT OFFICE

WILLIAM H. LONG, OF BERKELEY, CALIFORNIA, ASSIGNOR, BY MESNE ASSIGNMENTS, TO FAIRFAX WILLIAMS AND THOMAS C. WILLIAMS

WHEEL-RIM MOUNTING

Application filed September 14, 1927. Serial No. 219,423.

The invention relates to a means for seating and locking a demountable rim on a wheel by the appropriate manipulation of a member carried on the wheel hub.

A proper mounting of a demountable rim on a usual wheel providing a conically tapered seat for the rim involves a number of practical considerations. Thus, it is found that demountable rims, as manufactured, differ somewhat from their rated sizes and shapes so that different adjusted settings of movable rim engaging members of a given wheel must be possible for effecting their required engagement with different rims which are intended for use on the wheel.

Furthermore, owing to the before mentioned variations in the shapes of rims, it is not practicable to depend on the simultaneous wedged engagement of a rim with opposite sides of the wheel seat as has been the usual practice in structures of the type to which my invention particularly relates; it being noted that in the latter event, a theoretically proper distribution of the bearing pressure is impossible unless the rim be specially fitted to the wheel. Since rims are desirably used interchangeably on wheels, such fitting of a rim to a wheel, beside adding to the manufacturing cost of both the wheel and rim, necessitates the use of "matched" wheels and rims, and is manifestly impractical. It will now be clear that the ideal means for mounting a demountable rim on a wheel is one which is completely self-adjusting to meet all possible variations on rims as manufactured for the wheel, and without necessity of a special fitting of the rim to a wheel on which it is to be used, and it is accordingly a major object of the present invention to provide a rim mounting which provides for such complete adjustable fitting of a stock rim to a wheel equipped with the mounting of my invention.

Another object of the invention is to provide in a mounting of the class described the use of which requires no alterations in or additions to stock rims to be mounted on a wheel equipped therewith.

A further object of the invention is to provide a mounting of the class described which is self-locking.

A still further object of the invention is to provide a mounting of the character described which is of extremely simple structure and involves a minimum number of parts.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claim.

Referring to said drawings:

Figure 1 is a side view, partly in section, of a wheel equipped with the mounting of my invention, such mounting being operatively engaged with a wheel.

Figure 2 is a sectional view taken on the broken line 2—2 in Figure 1.

Figure 3 is an enlarged fragmentary section taken on the line 3—3 in Figure 1.

Figure 4 is an enlarged fragmentary view of a portion of the showing of Figure 2.

Figure 5 is a perspective view of certain operative parts of the device removed from the wheel.

As herewith particularly disclosed, the mounting of my invention is incorporated with a wheel 8 arranged to be removably mounted on a vehicle axle shaft (not shown), said wheel comprising a hub 9 having spokes 11 radiating therefrom and terminating in a fixed rim 12. The rim 12 is of greatest diameter at its inner side and is provided at its periphery with a conically tapered seat 13 having the apex of its cone at the outer side of the wheel and in the axial line thereof and arranged for a wedging engagement beneath the inner edge 14 of a demountable rim 16 of a usual type.

As shown, the inner periphery of the rim 16 is generally cylindrical except that the outer rim edge 17 is offset inwardly to provide therein a groove 18 for a tire retaining bead 19 between which and the rim edge 14 a tire (not shown) is arranged to be mounted and held.

Displaceably mounted on the wheel are rim lugs 21, such lugs being movable from a retracted position to engage the edge 17 of the removable rim in such manner as to wedge the latter to a seated engagement of its inner edge 14 with the wheel rim seat 13. The lugs 21 are also arranged to cooperate to support the outer edge 17 of the rim 16 in spaced relation from the opposed wheel rim portion whereby the edge 17 is supported only at spaced points therealong and does not directly engage the wheel rim. Each of the lugs is provided with a bearing face 18 which is obliquely related to the wheel axis whereby movement thereof either axially or radially against the edge 17 of the demountable rim will simultaneously urge the latter both axially inwardly and radially outwardly. It will now be noted that the seating pressures of the rim 16 against the seat 13 and lug faces 18 are determined entirely by the disposal of the lugs with respect to the rim 16 and may be of any desired magnitude in accordance with the force utilized in operatively disposing the lugs, there being no means to limit the operative engagement of the lugs with the rim except the reaction of the seating pressure. In this manner, rims differing from each other and their rated sizes may be properly mounted on a given wheel wth equal facility, so that special fitting of a rim to a particular wheel, or a wheel to a particular rim, is not necessary, it being also noted that a stock rim may be used without special members or rim alterations.

Means are provided for simultaneously effecting like movements of the lugs 21 to or from their operative positions whereby upon the operation of a single actuating means, a rim may be gripped or released. In the present showing, certain of the spokes 11 are provided with radial guideways in which rods 22 are mounted for reciprocation, such rods being unitarily connected with the lugs 21 for effecting the movement thereof. Preferably, and as shown, the lugs 21 are mounted directly on the outer ends of the rods 22 whereby their operative motion is radial with respect to the wheel. To provide the guideways in all-metal wheels having hollow spokes such as that here shown, webs 23 and 24 are provided across the outer and inner spoke ends respectively, which webs are perforated to provide cooperating guideway bearing portions 26 and 27 for receiving the rods. The rods 22 are preferably of steel, and when the wheel is formed of a light and relatively soft material such as aluminum, no fluid lubrication will be needed at the bearings 26 and 27.

Generally, and as shown, when a rim 16 is mounted on a wheel of usual design, the rim edge 17 will lie axially outwardly of the plane of the spokes, so that the lugs 21 must be mounted in offset relation to the rods 22. Accordingly, each lug is formed with a stem portion 31 arranged to be suitably fixed, as by riveting, to the outer end of the rod which carries it and disposed generally parallel to the wheel axis. Extending radially outwardly from the forward end of the lug portion 31 is a portion 32, which portion is provided at its inner side with the bearing face 18 which, as previously pointed out, is arranged to slidably engage the edge 17 of the demountable rim. Extending radially inwardly from the lug portion 31 is a portion 33 which is disposed opposite and normally lightly engaging the opposed portion of the face 36 of the wheel rim 12. Preferably, the general plane of the face 36 opposite a lug is parallel to the line of movement of such lug whereby the relation of the lug portion 33 to the face 36 will be maintained for different adjusted positions of the lug. The lugs, it will be noted, are arranged to be projected outwardly of a withdrawn position which permits a disposal of a demountable rim about the wheel and against the seat 13, whereby their engagement with the rim as they are projected radially outwardly will forcibly seat the rim on the seat 13 and the lug faces 18 in the manner hereinbefore set forth, the pressure of such seating depending entirely on the positioning of the lugs. In the event that the seating pressure is sufficient to flex the connections between the lugs and their rods, the engagement of the lug portions 33 with the surface 36 is designed to limit such flexure to a minimum and so strengthen the rim support provided at and by the lugs. It will now be clear that the seating pressure at all points of support for the rim is completely adjustable in terms of the disposition of the rods 22, and that the operative disposition of such rods is desirably variable for the mounting of different rims on a given wheel. It will of course now be obvious that the rods and lugs together constitute units which may, for convenience, be referred to as lock bolts.

Means are provided for simultaneously actuating the rods 22 in such manner that the rods may be simultaneously and variably projected for engaging the lugs with a demountable rim. Rotatably mounted on the wheel-hub 9 within the wheel is an actuator member 37 comprising a tubular sleeve portion 38 having a radially extending flange portion 39 provided thereon inwardly of the end thereof which lies nearest to the wheel hub-cap 41. Formed on the outer face 42 of the actuator portion 39 is a spiral track 43, such track being at least 720 degrees of arc in length and having the radially opposed portions thereof equally spaced throughout its length. The track, it will be noted, is preferably of rectangular section and the parts thereof lie in common planes. Formed across the inner sides of the rods 22 at their inner ends thereof opposite the track 43 are transverse grooves 44 arranged to slidably receive said track, the latter being so disposed with relation to the rods that the track will always be disposed in the plane determined by the grooves of the different rods. Preferably, and as shown, two groups 44 are provided in each rod in both of which the track is arranged to be engaged when the lugs are operative against a demountable rim. Since the lugs are at all times to be similarly disposed, the grooves 44 of the different rods will, of course, be differently disposed along the rods. Preferably, and as shown, the pitch of the track 43 is such that one complete revolution of the actuator member is required to protect the lugs from their withdrawn position to an average operative position, the distance of such movement being, in practice, about one half inch—when, as shown, four lugs are used, the difference in the positions of the grooves of adjacent rods would be one-fourth of the pitch of the track or about one-eighth inch.

It will now be clear that rotation of the actuator in an appropriate direction will effect like projections or withdrawals of the lugs and that the projection of the lugs may be made as required to secure a proper engagement pressure thereof with a demountable rim, since no stop is imposed on the movement thereof or of the rods other than that provided by the reaction pressure of the rims, complete adjustability of the rim engaging pressure being thus provided for. Furthermore, the relatively low pitch of the track 43 is usually sufficient to hold it in set position, whereby the provision of a special securing means therefor is not essential. The use of the spiral track in the manner shown, it will be noted, produces equal displacements of the lugs for a given degree of rotation of the actuator from different initial positions thereof. When no rim is mounted on the wheel, the lug projecting movement of the actuator is arranged to continue until the outermost track end becomes disengaged from the innermost groove 44 of a rod to thereby release the rod for withdrawal from the guideway, assembly of the device being made in a reverse manner. It will be noted that the number of parts is a minimum, comprising, as it does only the lock bolt units, and the actuator.

Operative displacements of the actuator 37 may be effected in any suitable manner, and as here shown, the hub cap 41 is utilized as the means for effecting the necessary rotation of the actuator. Preferably and as shown, the cap 41 is provided at its base with an annular flange 46 for engagement in a seat 47 provided in the outer hub plate 51 connecting the spokes and is arranged to be releasably held in such seat by means of a ring 52 fixed to the plate as by screws 53 and overlying the flange 46. Extending inwardly from the cap is a sleeve 54, such sleeve being of the same diameter as the actuator sleeve 38 and being coaxial therewith when the cap is mounted on the wheel as described. The opposed ends of the sleeves 38 and 54 are provided with clutch teeth 56 and 57 respectively which are arranged for mutual interengagement when the cap is mounted on the wheel whereby rotation of the cap by the use of a suitable tool (not shown) will directly effect a corresponding rotation of the actuator. To prevent an accidental or unauthorized rotation of the hub cap, a suitable locking means 58 is preferably provided, such means being arranged to be set in locked condition independently of the disposition of the hub cap whereby a setting thereof, when free, may be made entirely in terms of the rim engaging pressure of the lugs.

I claim:

In combination with a spoked wheel having a fixed wheel rim providing at an edge thereof a seat for a demountable rim, a rim demountably disposable about said wheel rim and arranged to have an edge portion thereof forcibly engaged with said seat, a rim lug carried by said wheel and radially projectible directly against the outer side portion of the other edge of said demountable rim for effecting said forcible engagement thereof with said seat, and a member mounted for radial reciprocation in the spokes of said wheel and carrying said lug in offset relation to the axis thereof.

In testimony whereof, I have hereunto set my hand at Oakland, California, this 3rd day of September, 1927.

WILLIAM H. LONG.